United States Patent Office 3,808,294
Patented Apr. 30, 1974

3,808,294
ADHESIVE COMPOSITIONS
Koichi Sato, Suita, Osaka, Akira Niki, Hirakata, Osaka, Hiroshi Kitamura, Yasu-gun, Shiga-ken, and Masanobu Morimoto, Ibaragi, Osaka, Japan, assignors to Asahi Kasei Kogyo Kabushiki Kaisha, Kita-ku, Osaka, Japan
No Drawing. Continuation-in-part of abandoned application Ser. No. 47,564, June 18, 1970. This application Jan. 14, 1972, Ser. No. 217,966
Claims priority, application Japan, June 20, 1969, 44/48,821
Int. Cl. C08f 15/40; C08g 22/08
U.S. Cl. 260—878 R          5 Claims

ABSTRACT OF THE DISCLOSURE

Adhesive compositions for effecting adhesion between an ethylene-vinyl acetate copolymer and a solid material. The compositions comprise (A) a grafted product obtained by reacting an ethylene-vinyl acetate copolymer or a derivative thereof with a carboxylic acid or its anhydride having a double bond conjugated with a carbonyl group in the molecule and (B) a compound having two or more terminal isocyanate groups.

---

This is a continuation-in-part application of United States patent application Ser. No. 47,564, filed June 18, 1970, which has been abandoned.

BACKGROUND OF THE INVENTION (1) Field of the invention

This invention relates to adhesive compositions comprising (A) a graft copolymer obtained by reacting an ethylene-vinyl acetate copolymer (hereinafter referred to as EVA) or a derivative thereof with a carboxylic acid or its anhydride having a double bond conjugated with a carbonyl group and (B) a compound having two or more terminal isocyanate groups as active ingredients.

(2) Description of the prior art

EVA is a hot-melt adhesive most widely used now-a-days, which is used as a base polymer of adhesive compositions for a wide variety of adherents including paper, wood, fibers, metals and plastics including polyolefins. EVA adhesives containing rosin, indene, paraffin, wax or the like are especially suitable for book-binding or bag-making, lacquer- or wax-finishing of paper or adhering a plastic film to a paper. However, as EVA has no inherent functional group capable of effecting adhesion though being polar due to its ester group, it is difficult to effect satisfactory adhesion by the use of EVA as it is an adhesive or a coating material. EVA containing a larger portion of vinyl acetate, which is sufficiently tacky to be easily adhered as compared with EVA containing vinyl acetate as little as several percent, does not produce a satisfactorily high degree of adhesion because of the decrease in cohesive force. Furthermore, adhesion between EVA containing a smaller portion of vinyl acetate and an adherent is defective in creep resistance, water-proofness, heat resistance, solvent-proofness and degree of adhesion over a long period of time, because, even if EVA containing a larger portion of vinyl acetate is used as the adhesive, there is formed neither a chemical bond with the adherent nor a cross-linkage between molecules of the adhesive.

SUMMARY OF THE INVENTION

With the object of producing firm adhesion between an EVA coating material and an adherent solid material, as well as improving the durability of the adhesion strength or peeling strength, we have made extensive investigations to find adhesives capable of effecting far firmer and more durable adhesion as compared with the prior art adhesives of the EVA family.

It is an object of this invention to provide adhesive compositions comprising as the main ingredients:
(A) A grafted product of EVA or a derivative thereof with a carboxylic acid or its anhydride having a double bond conjugated with a carbonyl group as specified hereinbelow (grafted EVA), and
(B) A compound having two or more isocyanate groups. Other objects will be apparent hereinafter.

The grafted EVA is provided with polarity due to the presence of ester groups as well as with functionality due to the presence of carboxyl groups, and thus being capable of effecting firm adhesion between the adherent and the EVA coating material.

We have now found that an adhesive composition containing, in addition to the grafted EVA, a compound having isocyanate groups leads to a great improvement of adhesion strength of the above-mentioned adhesive composition. According to the present invention, the adhesive composition containing as the main ingredients the grafted EVA and a compound having isocyanate groups when applied to the surface of adherent prior to adhering an EVA coating material with an adherent, enables far firmer adhesion between the EVA and the adherent.

"EVA and derivatives thereof" which are grafted with a carboxylic acid or its anhydride having a double bond conjugated with a carbonyl group include ethylene-vinyl acetate copolymers having a density from 0.93 to 0.99, a vinyl-acetate content from 2 to 70% by weight and a melt index according to ASTM TM–D–1238 (revised) from 2 to 150 g./10 min. and chlorinated, chlorosulfonated or sulfonated products of said ethylene-vinyl acetate copolymers, for example, chlorinated EVA containing chlorine from 5 to 30% by weight and chlorosulfonated EVA containing chlorine from 1 to 40% by weight and sulfur from 0.05 to 7% by weight.

The grafted EVA or derivative thereof is obtained by subjecting EVA or a derivative thereof to a reaction with a carboxylic acid or its anhydride having a conjugated double bond as specified hereinbelow. In practice, the reaction is carried out in a solution of an appropriate solvent. As the solvent an aliphatic or aromatic hydrocarbon, a chlorinated hydrocarbon or the like may be well utilized. Examples of suitable solvent include xylene, toluene, trichloroethylene and carbon tetrachloride. Most preferred is xylene in view of radical chain transfer to the solvent, boiling point and reactivity.

In carrying out the reaction, EVA or a derivative thereof is dissolved in the above-cited solvent at ordinary temperature or by heating, followed by addition of a carboxylic acid or its anhydride having a conjugated double bond as specified hereinbelow. After forming a homogeneous solution or dispersion, followed by deoxygenation, the homogeneous phase is heated to a temperature from 70 to 130° C., to which a peroxide dissolved in an appropriate solvent is added dropwise. It is important in the above procedure to add a carboxylic acid or its anhydride having a conjugated double bond and a peroxide separately. Suitable proportions of the reagents are from 5 to 30 parts by weight of a carboxylic acid or its anhydride having a conjugated double bond, from 0.5 to 10 parts by weight of a peroxide and from 200 to 500 parts by weight of a solvent per 100 parts by weight of EVA or a derivative thereof. Exemplary peroxide include benzoyl peroxide, dibenzoyl peroxide, dicumyl peroxide and the like and benzoyl peroxide is especially effective. A reaction time from 1 to 3 hours is sufficient for the reaction. Passing an inert gas through the reaction system is considered to be desirable for the reaction time as well as in effect. Infrared absorption spectrum of the reaction product purified by means of acetone reprecipitation indicates the presence of carbonyl groups, which demonstrates the formation of a graft compound.

Choice of the EVA in the present invention depends upon the object to be achieved and preferred content of vinyl acetate is from 2 to 70% by weight of the EVA. The derivatives illustrated above, for example, are obtained by subjecting EVA to chlorination or chlorosulfonation by dissolving EVA in carbon tetrachloride followed by addition of a small amount of titanium oxide and then introducing dry chlorine gas or simultaneously chlorine gas and sulfur dioxide gas into the mixture while heating at 70–100° C. with vigorous stirring. Then, from the bottom of the reaction vessel is continuously introduced running water with slow stirring to wash off the hydrochloride, sulfuric acid or the like formed, immediately followed by steam distillation to recover the solvent. There is obtained a solid chlorinated or chlorosulfonated product of EVA. However, utility of this invention will be independent of the particular process of producing the derivative.

The specific compounds with a double bond conjugated with a carbonyl group according to the present invention include maleic acid, maleic anhydride and acrylic acid and especially effective are maleic acid and maleic anhydride. The above-cited compound in an amount from 5 to 30 parts by weight per 100 parts by weight of the starting EVA polymer is sufficient for the reaction. The grafted EVA per se is so chemically stable that it has no tendency at all to be decomposed or reacted with elapse of time.

The compounds having isocyanate groups which may be used in the present invention include, for example, isocyanate monomers such as 4,4',4''-triphenylmethane triisocyanate, 4,4'-diphenylmethane diisocyanate, tolylene 2,4-diisocyanate, tetramethylene diisocyanate, hexamethylene diisocyanate and the like or phenol-blocked derivatives thereof, and in addition, there are included compounds obtained by reacting such an isocyanate monomer with a polyester, a polyether, a diol or the like containing two or more active hydrogens per molecule at a molar ratio of NCO/OH over 1. All of these isocyanate compounds have two or more end isocyanate groups. Incorporation of the compound with isocyanate groups leads to formation of the desired cross linking bonds between the adhesive molecules or between the adhesive and the adherent solid material. When an adhesive composition comprising the grafted EVA alone is used, the adherent may be pretreated with the above-described compounds having isocyanate groups. However, the pretreatment leads to a multi-step adhesion process which is less advantageous.

The incorporated amount of the compounds with isocyanate groups is suitably from 0.1 to 10 parts by weight per 100 parts by weight of the grafted EVA. Incorporation in amounts more than the above-cited is disadvantageous because of reduction in stability of the grafted EVA in practical use.

The adhesive composition of this invention may be either in the form of a mixed solution of the grafted EVA and a compound having isocyanate groups or in the form of a powder, film, flake or granule obtained by regenerating and coagulating the grafted EVA from the mixed solution of the grafted EVA and a compound having isocyanate groups with a solvent such as acetone or methanol. To the solution of grafted EVA obtained by the graft reaction may be added a compound having isocyanate groups and a desired amount of solvent and the resulting diluted solution may be used as it is. The presence of the unreacted starting material mixed with the reaction product does not adversely affect the adhesion strength or peeling strength. The grafted product is employed at a concentration of 10% or lower.

Procedures of producing adhesion between an EVA coating material and an adherent by the use of the adhesive composition of this invention will be described below.

The adhesive composition may be appropriately used either in solid or in solution as described above. When the adhesive is used in solution, a solution of the adhesive composition of the invention is applied to the surface of an adherent, or an adherent is dipped in said solution followed by evaporation to remove the solvent. When used in film, powder or the like, the adhesive composition of the invention is uniformly contacted with or dusted on the adherent followed by application of heat (80–200° C.) and pressure. The adhesive composition is then melted, thereby being fluidized to form a film upon the surface of the adherent. The applied amount of the adhesive composition is preferably from 0.5 to 30 g./m.$^2$ of the area to be adhered. Adhesion is completed by layering an EVA sheet or film over the adherent pretreated with the adhesive composition of this invention followed by hot-pressing or by applying thereto a solution or melt of EVA. The coated material from the adhesion thus produced involves firm adhesion of EVA to the adherent, which is also excellent in durability. As described above, interposition of the adhesive composition of this invention between EVA and an adherent is effective in producing excellent adhesion between the two.

Adherents referred to herein are polar and nonpolar solid materials including metals, fibrous materials, wood, molded products of thermosetting resins, for example, phenol resin, urea-formalin resin and melamine resin, molded products of thermoplastic polymers, for example, polyethylene, polypropylene, polyamide, polyvinyl chloride, polystyrene, polyvinyl alcohol and polyacrylonitrile, diene rubbers, for example, natural rubber, butyl rubber, chloroprene rubber, butadiene rubber, SBR, NBR and similar products, and other materials such as ceramic ware, glass and concrete. Any shape of the materials may be employed such as film, sheet, cloth or cylinder. As described above, it is possible to provide a variety of EVA-coated products by the use of the adhesive composition according to the present invention for producing firm and durable adhesion between a wide variety of solid materials and EVA.

DESCRIPTION OF PREFERRED EMBODIMENTS

The examples which follow are submitted to illustrate and not to limit this invention, in which parts are by weight.

COMPARATIVE EXAMPLE 1

100 parts of EVA containing 25% by weight of vinyl acetate and having a softening point of 188° C. measured by ring and ball method, a density of 0.95 g./cm.$^3$ and a melt index of 2, were added with 20 parts of maleic anhydride and 350 parts of m-xylene and dissolved at 120° C. with stirring to give a solution. To the resulting solution was added dropwise a solution of 2 parts of benzoyl peroxide dissolved in 50 parts of m-xylene, followed by reaction for 2 hours. The reaction mixture was poured into acetone to precipitate the grafted EVA. The resulting polymer was regenerated by drying at 50° C. for 3 hours, softening point 180° C. measured by ring and ball method. Analysis of the regenerated polymer by infrared absorption spectrum distinctly indicated characteristic peaks for maleic anhydride at 1785 cm.$^{-1}$ and 1860 cm.$^{-1}$. The regenerated polymer was extruded at 80° C. by means of a two roll mill to a film of 0.1 mm. thickness. By the use of the film thus obtained was made adhesion between EVA containing 25% by weight of vinyl acetate and polyethylene films in such a way as set forth below. On a polyethylene film 0.5 mm. in thickness and 30 x 30 mm. in size were overlaid a film of the graft copolymer prepared above and further a film of the EVA above mentioned having a thickness of 0.5 mm. and a size of 30 x 30 mm., and the resulting assembly was adhered together by hot-pressing at 150° C. under a pressure of 1 kg./cm.$^2$ for 60 seconds. Whereas an adhesive strength was 0.5 kg./25 mm. width with a test piece 25 mm. wide and 200 mm. long produced by direct adhesion between EVA and polyethylene film made under the same conditions as above, when peeled at a tension velocity of 20 cm./min., the use of the adhesive composition of this invention produced an adhesive strength of 17 kg./25 mm. width.

COMPARATIVE EXAMPLE 2

Adhesion was made between an EVA film of a vinyl acetate content of 15% and an iron plate using a 5% toluene solution of the same regenerated graft copolymer as in Comparative Example 1 as the adhesive. The surface of an iron plate was thoroughly rinsed with benzene and applied with the above-mentioned adhesive, followed by air drying. The EVA film was placed on the treated surface of the iron plate and hot-pressed at a temperature of 150° C. under a pressure of 1 kg./cm.² for 120 seconds. Shear strength per 10 x 10 mm.² was 0.2 kg. with the untreated product, whereas it was 8.4 kg. with the treated one.

EXAMPLE 1

Grafted EVA obtained by reacting 100 parts of EVA containing 25% of vinyl acetate and having a density of 0.95 g./cm.³ and a melt index of 2 with 30 parts of a compound with a conjugated double bond in the same way as in Comparative Example 1 was precipitated with acetone to remove the unreacted monomer. Dried flakes of the products thus obtained were dissolved in a 1:1 mixture by volume of xylene and toluene to a solid concentration of 6%. An adhesive solution was prepared by adding 0.65 part of an addition compound of toluylene-2,4-diisocyanate with trimethylolpropane (trademark Desmodur L, manufactured by Bayer) to 100 parts of the above-prepared solution. Scored plain fabrics made of nylon 420 d. filaments of a density of 35 x 35/in. were dipped in the above-described adhesive solution followed by squeezing to a pick-up of 40% by weight and drying at 130° C. for 3 minutes. On the adhesion-treated cloth thus produced was placed a film 2.5 mm. in thickness of EVA containing 25% of vinyl acetate, followed by hot-pressing at a temperature of 140° C. under a pressure of 2 kg./cm.² for 60 seconds to prepare a coated cloth. Peeling strength of the resulting coated cloths are as follows:

| Monomer grafted with: | Peeling strength, kg./25 mm. |
| --- | --- |
| Maleic acid | 12 |
| Maleic anhydride | 11 |
| Acrylic acid | 5.2 |
| Itaconic acid | 2.0 |
| Dibutyl maleate | 1.0 |
| Blank | 0.5 |

EXAMPLE 2

A grafted EVA was produced by reacting 100 parts of EVA containing 28% by weight of vinyl acetate (trademark Evaflex 260, manufactured by Mitsui Polychemical), having a softening point of 88° C. measured by ring and ball method, a density of 0.95 and a melt index of 150, and 15 parts of maleic acid at 100° C. in the same manner as in Comparative Example 1 using a 1:1 mixture by volume of toluene and xylene as the solvent and purified three times by precipitation with acetone. A solution for adhesion treatment was prepared by adding 1 part of triphenylmethane-4,4′,4″-triisocyanate (trademark Desmodur R, manufactured by Bayer) to 100 parts of a xylene solution containing 5% by weight of the purified product obtained above.

Scored plain fabrics made of nylon 840 d. filaments having a density of 38 x 25/in. were dipped in the above-described solution for adhesion treatment followed by squeezing of the solution to a pick-up of 40% by weight and drying at 150° C. for 3 minutes to prepare an adhesion-treated cloth. On the adhesion-treated cloth were placed EVA films of various vinyl-acetate contents each 2 mm. in thickness, respectively, followed by hot-pressing at a temperature of 150° C. under a pressure of 2 kg./cm.² for 60 seconds to prepare a coated cloth. Peeling strength of the resulting coated cloths are shown in the following table.

| Coating material | | Peeling strength | |
| --- | --- | --- | --- |
| Trade name of EVA | Content of vinyl acetate (percent) | Control (untreated) (kg./25 mm. width) | Cloth treated with the grafted copolymer solution (kg./25 mm. width) |
| Evaflex 660 | 8 | 0.1 | 4.3 |
| Ulthathene 630 [1] | 15 | 0.3 | 9.3 |
| Alathon 3190 | 25 | 0.6 | 9.4 |
| Evaflex 260 | 28 | 0.6 | 8.6 |
| Evaflex 150 | 33 | 1.3 | >7.0 |

[1] Made by U.C.L.

EXAMPLE 3

100 parts of EVA containing 25% of vinyl acetate and having a density of 0.95 g./cm.³ and a melt index of 2.0 and 20 parts of maleic anyhdride were dissolved into 350 parts of m-xylene at 120° C., respectively. To the resulting solutions was added dropwise a solution of 2 parts of benzoyl peroxide dissolved in 50 parts of m-xylene over thirty minutes, followed by reaction for 2 hours at 120° C. with stirring.

To the reaction product was added an amount of m-xylene to give a solution containing 5 parts of the grafted EVA obtained by the reaction mentioned above dissolved in 94 parts of m-xylene. One part of 4,4′,4″-triphenylene triisocyanate (trademark Desmodur R, manufactured by Bayer) was added to the solutions thus obtained, respectively, to produce adhesive compositions of the present invention.

For comparison, EVA was esterified according to the procedures which follow:

100 parts of the same EVA as that used in the graft reaction in the preceding paragraph and 5 parts of p-toluene sulfonic acid were dissolved into 300 parts of m-xylene at 120° C. To the resulting solution was added dropwise a solution containing 20 parts of maleic anhydride in 100 parts of m-xylene at 100° C., followed by esterification for 3 hours at 120° C. with stirring.

To the reaction product was added an amount of m-xylene to give a solution containing 5 parts of the esterified EVA obtained by the reaction mentioned above dissolved in 94 parts of m-xylene. One part of 4,4′,4″-triphenylene triisocyanate (trademark Desmodur R, manufactured by Bayer) was added to the solution thus obtained to produce an adhesive composition for comparison.

Plain weave of 6-nylon of 420 d. were dipped in the above-mentioned solutions, followed by squeezing to a wet pick up of 45% and drying at 150° C. for 5 minutes. On the resulting cloths were respectively placed the EVA film having a vinyl acetate content of 25% and a thickness of 2.0 mm., followed by hot-pressing at a temperature of 160° C. under a pressure of 1.5 kg./cm.² for 60 seconds to prepare coated cloths. The peeling strengths of the coated cloth using grafted EVA was 10.5 kg./25 mm. width, while that of the coated cloth using esterified EVA was 1.2 kg./25 mm. width.

Analysis of the films produced from the purified solid grafted EVA and esterified EVA obtained by fractionation from the reaction products described above reveals that the former have sharp characteristic peaks for maleic anhydride at 1785 cm.⁻¹ and 1860 cm.⁻¹, while the latter has no clear peaks.

As clearly noted from the above experiments, the adhesive composition containing grafted EVA has a markably superior adhesion strength to that of the adhesive composition containing esterified EVA.

EXAMPLE 4

Adhesive compositions containing Desmodur R were prepared from EVA containing 8, 25 and 40% of vinyl acetate in the same procedures as described in Example 3.

Plain weave of 6-nylon of 840 d. were dipped in the above mentioned adhesive compositions, followed by squeezing to a wet pick-up of 45% and drying at 160° C. for 3 minutes. On the resulting cloths were respectively placed the EVA films having a vinyl acetate content of 25% and a thickness of 1.5 mm., followed by hot-pressing at a temperature of 160° C. under a pressure of 1.5 kg./cm.² for 45 seconds to prepare coated cloths. The peeling strengths between the coated cloths and the EVA films are shown in the following table:

| | Peeling strength (kg./25 mm. width) | |
|---|---|---|
| Vinyl acetate content of the grafted EVA (percent) | Grafted EVA containing no isocyanate compound | Grafted EVA containing isocyanate compound |
| 8 | 3.0 | 7.0 |
| 25 | 4.1 | 10.0 |
| 40 | 1.0 | 3.2 |

EXAMPLE 5

100 parts of EVA containing 25% by weight of vinyl acetate was dissolved by heating in 300 parts of carbon tetrachloride to give a solution. To the resulting solution was added 0.5 part of titanium oxide. The mixture was chlorinated by introducing dry chlorine gas at 80° C. with vigorous stirring at a gas flow velocity of 15 liters per hour for 5 hours. Running water was introduced from the bottom of the vessel to wash off the remaining hydrogen chloride followed by drying. Chlorinated EVA having a chlorine content of 30.2% was produced. 100 parts of the chlorinated EVA were reacted with 20 parts of maleic anhydride by the same procedures as in Comparative Example 1 except that dibenzoyl peroxide was used as a peroxide to prepare a grafted product. The grafted product was diluted with toluene to a solution having a solid content of 5%. To 100 parts of the solution were added 2 parts of a straight urethane prepolymer having isocyanate groups at both ends (trademark XL-1301, manufactured by Takeda Chemical Industries) and an amine equivalent of 850-900 to prepare the adhesive of this invention. The adhesive was applied to films of a rubber sheet and a plastic at a ratio of about 5-10 g./m.², followed by drying at 100° C. for 10 minutes. A mixture of 100 parts of EVA having a vinyl-acetate content of 25% and 2 parts of, as a solvent, wax kneaded in a roll was extruded to a film. The film was placed on the surface with the adhesive applied followed by hot-pressing at a temperature of 150° C. under a pressure of 1 kg./cm.² for 100 seconds to complete the adhesion treatment. For comparison, a conventional EVA adhesive composition consisting of a toluene solution containing 10% by weight of EVA (being grafted) having a vinyl-acetate content of 40% and 2% of the above-mentioned isocyanate compound was applied to the adherent. The above-mentioned film was adhered to the treated adherent by hot-pressing and comparison was made on the peeling strength between the two. The results are shown in the following table:

| Adherent sheet | Control by the conventional method (kg./25 mm. width) | By the method of the invention (kg./25 mm. width) |
|---|---|---|
| NBR (vulcanized rubber) | 0.4 | 5.0 |
| NR (vulcanized rubber) | 0.5 | 2.0 |
| CR (vulcanized rubber) | 0.3 | 1.7 |
| Polyethylene | 0.4 | 13.0 |
| Polyester | 0.5 | 15.0 |
| PVC (soft) | 0.5 | 6.2 |

EXAMPLE 6

100 parts of EVA containing 25% by weight of vinyl acetate and having a density of 0.95 g./cm.³, and a melt index of 2.0 were dissolved in 300 parts of carbon tetrachloride to give a solution. To the resulting solution was added 0.5 part of titanium oxide. The mixture was chlorinated by introducing dry chlorine gas at 80° C. with vigorous stirring at a gas flow velocity of 15 liters per hour for 5 hours. The resulting product was poured into water to precipitate the chlorinated EVA. The chlorinated EVA was washed with water to remove chlorine. The chlorine content of the chlorinated EVA was 29.5% by weight.

Example 4 was repeated except that the chlorinated EVA obtained above was used. The results are shown in the following table:

| | | Peeling strength (kg./25 mm. width) | |
|---|---|---|---|
| | Chlorine content (percent) | Grafted EVA containing no isocyanate compound | Grafted EVA containing isocyanate compound |
| Sample: | | | |
| 1 | 30.6 | 5.2 | 6.8 |
| 2 | 16.8 | 4.8 | 6.1 |

EXAMPLE 7

To a solution of 100 parts of EVA containing 25% of vinyl acetate and having a density of 0.95/cm.³ and a melt index of 2.0 dissolved by heating in 300 parts of carbon tetrachloride were added 0.5 part of titanium oxide. Chlorosulfonation was made by introducing with vigorous stirring into the solution a mixture consisting of 1 part by volume of dry chlorine gas and 2 parts by volume of sulfur dioxide gas at a gas flow velocity of 10 liters per hour for 6 hours at 80° C. The reaction product was poured into water to remove the hydrogen chloride and sulfuric acid and the resulting mass was dried to prepare a chlorosulfonated EVA. Chlorine and sulfur content of the dried products were 17.2% and 3.7%, respectively.

Example 4 was repeated except that the chlorosulfonated EVA prepared according to the procedures described in the preceding paragraph was used.

The results are shown in the following table.

| | | | Peeling strength (kg./25 mm. width) | |
|---|---|---|---|---|
| | Percent | | Grafted EVA containing no isocyanate compound | Grafted EVA containing isocyanate compound |
| | Chlorine content | Sulfur content | | |
| Sample: | | | | |
| 1 | 17.2 | 3.7 | 5.5 | 8.8 |
| 2 | 10.5 | 1.2 | 4.8 | 8.0 |

What we claim is:

1. Adhesive composition for effecting adhesion between an ethylenevinyl acetate copolymer and a solid material, said adhesive composition consisting essentially of 100 parts by weight of a grafted product (A) obtained by reacting 100 parts by weight of an ethylene-vinyl acetate copolymer having a density of from 0.93 to 0.99, a vinyl acetate content of from 2 to 70 percent by weight and a melt index of from 2 to 150 g./10 minutes or a derivative thereof selected from the group consisting of a chlorinated ethylene-vinyl acetate copolymer having a chlorine content of from 5 to 30 percent by weight, a chlorosulfonated ethylene-vinyl acetate copolymer having a chlorine content of from 1 to 40 percent by weight and a sulfur content of from 0.05 to 7 percent by weight, and a sulfonated ethylene-vinyl acetate copolymer having a sulfur content of from 0.05 to 7 percent by weight, with from 5 to 30 parts by weight of maleic acid, maleic anhydride or acrylic acid, and (B) from 0.1 to 10 parts by weight of a compound having two or more terminal isocyanate groups.

2. Adhesive compositions according to claim 1 wherein said compound having isocyanate group is selected from the group consisting of triphenylmethane-4,4',4''-triisocyanate, diphenylmethane-4,4'-diisocyanate, toluylene-2,4-diisocyanate, tetramethylene diisocyanate, hexamethylene diisocyanate and phenol-blocked derivatives thereof, and compounds obtained by reacting said isocyanate monomer with a polyester, a polyether, or a diol containing two or more active hydrogens per molecule at a molar ratio of NCO/OH over 1.

3. Adhesive compositions according to claim 1, wherein 5 to 30 parts by weight of maleic acid are so reacted.

4. Adhesive compositions according to claim 1, wherein 5 to 30 parts by weight of maleic anhydride are so reacted.

5. Adhesive compositions according to claim 1, wherein said ethylene-vinyl acetate copolymer is so reacted.

References Cited

UNITED STATES PATENTS

| | | | |
|---|---|---|---|
| 3,749,756 | 7/1973 | Kosaka et al. | 260—878 R |
| 3,355,516 | 11/1967 | Hardt et al. | 260—878 R |
| 3,179,716 | 4/1965 | Bruin et al. | 260—878 R |
| 3,548,408 | 12/1970 | Worrall | 260—87.3 |

FOREIGN PATENTS

| | | | |
|---|---|---|---|
| 946,384 | 1/1964 | Great Britain | 260—878 |

JOSEPH L. SCHOFER, Primary Examiner

A. HOLLER, Assistant Examiner

U.S. Cl. X.R.

260—77.5 CR, 78.4 D, 897 B

UNITED STATES PATENT OFFICE
CERTIFICATE OF CORRECTION

Patent No. 3,808,294                    Dated April 30, 1974

Inventor(s) KOICHI SATO et al

It is certified that error appears in the above-identified patent and that said Letters Patent are hereby corrected as shown below:

Column 7, line 58: replace "(being grafted" with

---(without being grafted)--- .

Signed and sealed this 11th day of February 1975.

(SEAL)
Attest:

RUTH C. MASON
Attesting Officer

C. MARSHALL DANN
Commissioner of Patents
and Trademarks